Figure 3:
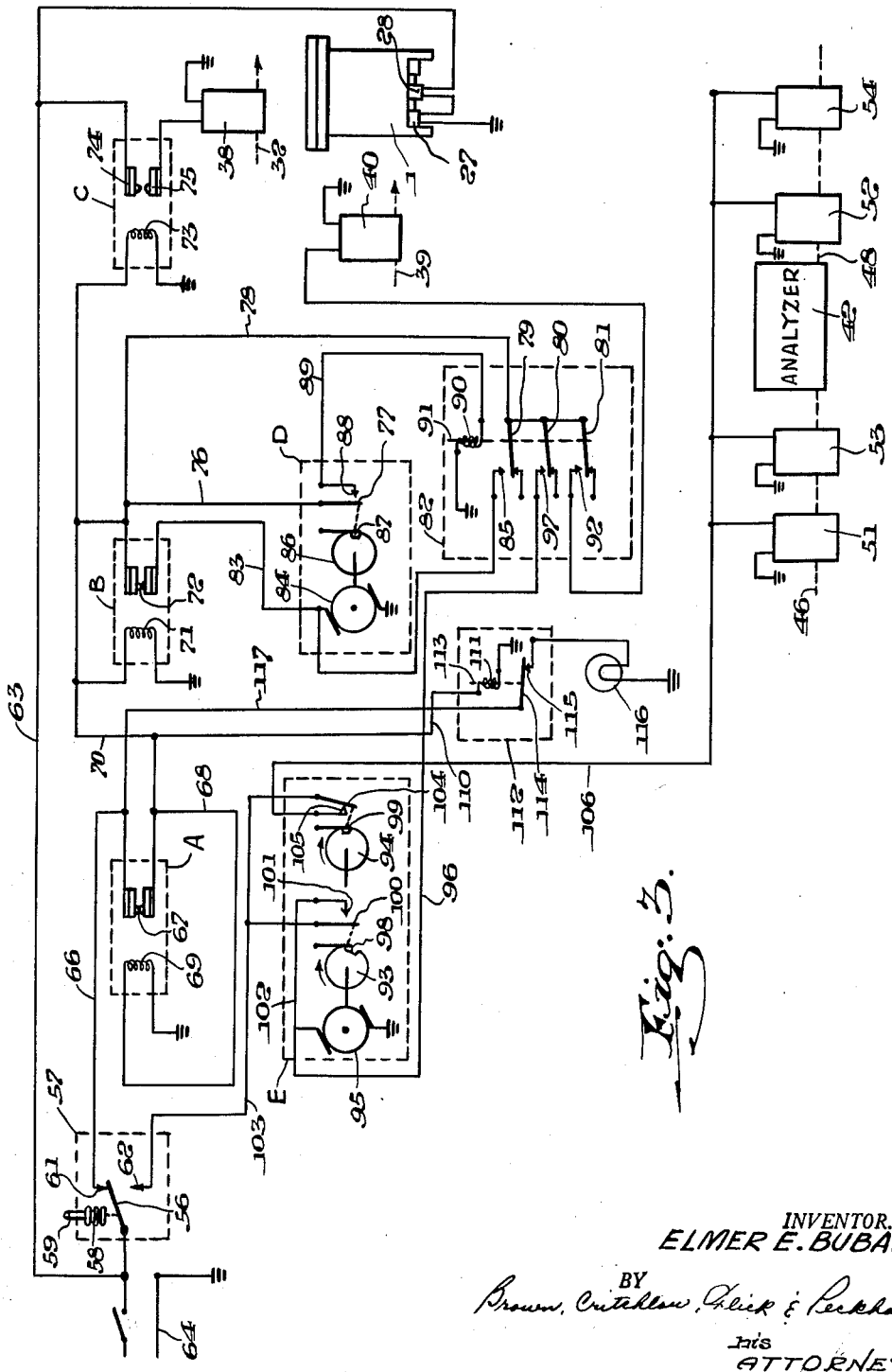

April 17, 1962
E. E. BUBAN
3,029,627
LIQUID OXYGEN ANALYZING APPARATUS
Filed Aug. 23, 1960
2 Sheets-Sheet 1
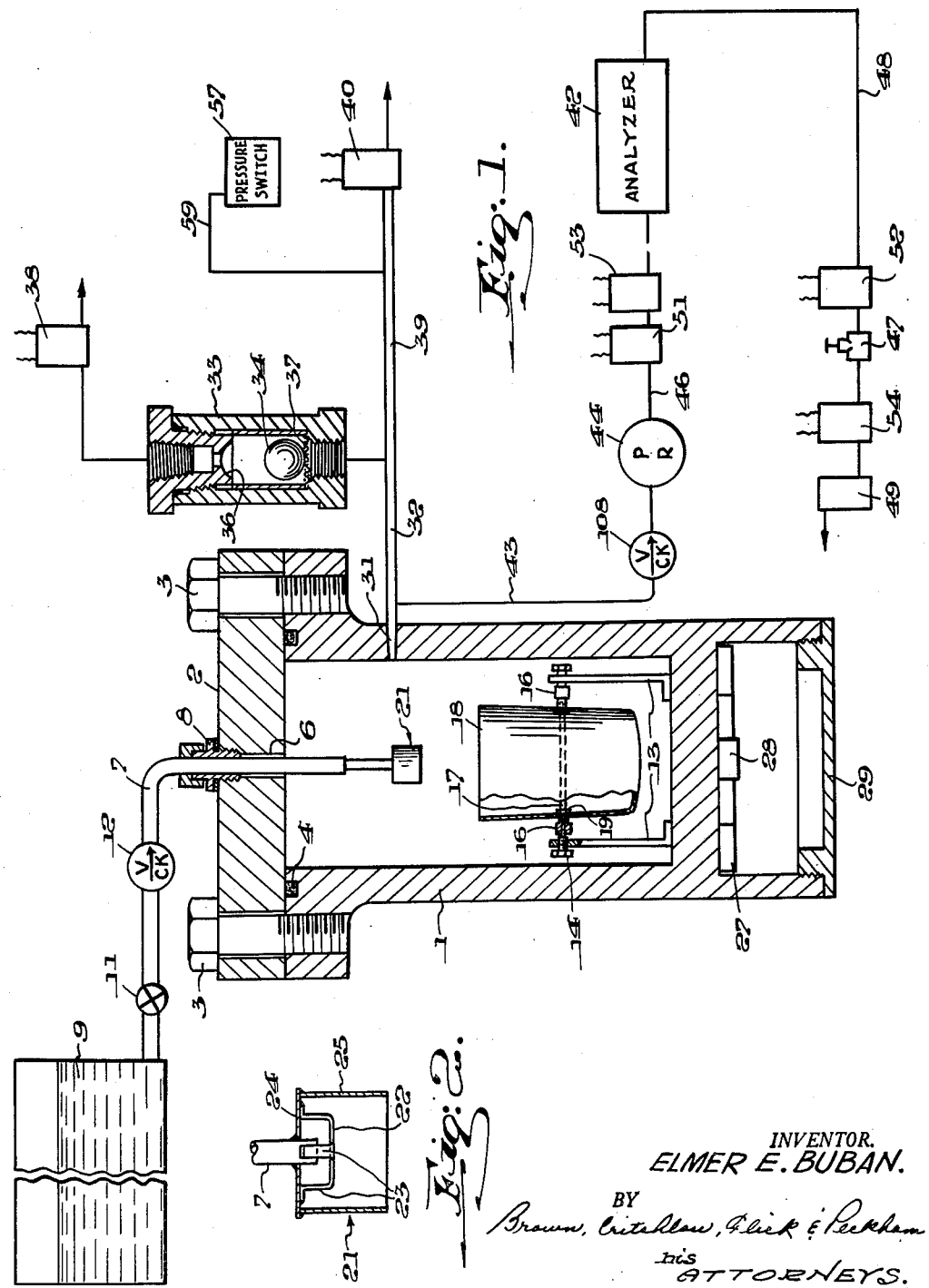
INVENTOR.
ELMER E. BUBAN.
BY
Brown, Critchlow, Flick & Peckham
his
ATTORNEYS.

INVENTOR.
ELMER E. BUBAN.

United States Patent Office 3,029,627
Patented Apr. 17, 1962

3,029,627
LIQUID OXYGEN ANALYZING APPARATUS
Elmer E. Buban, Monroeville, Pa., assignor to Mine Safety Appliances Company, a corporation of Pennsylvania
Filed Aug. 23, 1960, Ser. No. 51,430
14 Claims. (Cl. 73—23)

This invention relates to apparatus for analyzing liquid oxygen, more particularly by periodically analyzing samples of oxygen gas derived from a source of liquid oxygen.

It sometimes is very desirable to know whether a body of liquid oxygen contains certain impurities. For example, one may wish to determine whether liquid oxygen in a storage pool contains acetylene or other hydrocarbons in the parts per million range. That can be done with the help of an infrared analyzer if samples of gaseous oxygen are supplied to it.

It is among the objects of this invention to provide liquid oxygen analyzing apparatus which is simple in construction, automatic in operation, reliable in use, and which analyzes gaseous oxygen under high pressure to increase accuracy.

In accordance with this invention a pressure vessel is provided for receiving liquid oxygen through a conduit from a suitable source of supply. A receptacle in the vessel alternately receives a predetermined quantity of liquid oxygen from the conduit and discharges it onto a heated surface within the vessel to convert the liquid into high pressure gas. The pressure vessel is vented while liquid oxygen is filling the receptacle, but when the receptacle discharges its contents the vent is closed so that gas pressure can build up in the vessel. A gas pressure regulator is connected by conduits with the inside of the vessel and the inlet of the analyzer. A pair of valves between the vessel and the analyzer normally prevent gas flow in either direction. Another normally closed valve is connected with the outlet of the analyzer. The normally closed valves are opened after the vent has been closed, so that gas will flow from the vessel to the analyzer until the pressure in the vessel falls to a predetermined point, and then the analyzer is cut off and the pressure vessel is vented again.

The preferred embodiment of the invention is illustrated in the accompanying drawings, in which FIG. 1 is a diagrammatic view, with some elements enlarged and shown in section, of liquid oxygen analyzing apparatus;

FIG. 2 is an enlarged side view, partly broken away, of an oxygen deflector; and FIG. 3 is a wiring diagram for the system.

Referring to FIG. 1 of the drawings, a vessel that will withstand high internal gas pressures may be formed in various ways, but preferably as a flanged cylinder 1, the open top of which is closed by a heavy plate 2 detachably connected to the cylinder by bolts 3. The top of the cylinder may be provided with an annular groove containing a sealing gasket 4 compressed by the cover. The center of the cover has a passage 6 through it, through which an inlet conduit 7 extends. The conduit is sealed in the passage by a suitable packing gland 8. Outside of the pressure vessel the conduit extends to the pool or storage tank 9 that contains liquid oxygen which is to be sampled and tested. The conduit may contain a throttling valve 11 for regulating the flow of liquid oxygen from the tank to the pressure vessel. The conduit also contains a check valve 12 that will prevent flow of oxygen back toward the tank when the gas pressure inside the pressure vessel rises.

The floor of the pressure vessel cylinder supports a pair of laterally spaced brackets 13, in the upper ends of which inwardly projecting pivots 14 are screwed. The pivots support bearings 16, the inner ends of which are screwed onto the opposite ends of a horizontal rod 17. The rod extends through the opposite sides of a cup 18 and is rigidly secured thereto by nuts 19 threaded on the rod inside the cup for clamping the cup between the nuts and the inner ends of the bearings. The rod is located a short distance above the center of gravity of the cup so that while empty its open side will be uppermost. However, the cup flares upwardly so that when it is filled with a liquid the rod then will be below the center of gravity of the cup and the latter will pivot on the pivot pins and dump its contents onto the floor of the pressure vessel.

To prevent the force of the liquid oxygen issuing from the conduit from causing the cup to rotate prematurely, a deflector 21 is mounted on the lower end of the inlet conduit 7 to slow down and distribute the liquid. As shown in FIG. 2, this deflector may be a horizontal disc 22 located a short distance below the end of the conduit and having integral circumferentially spaced lugs 23 extending upward and secured to a circular plate 24 supported by the conduit. The edge of the plate supports a cylindrical shield 25 that is spaced a short distance from the edge of the disc and extends down below it. This device causes the liquid oxygen entering the pressure vessel to flow laterally in all directions and then down the inside of the shield and into the cup. Because of this, the oxygen enters the cup at a low velocity and the cup is not upset.

When the cup dumps its contents onto the floor of the pressure vessel, the discharged liquid oxygen immediately vaporizes and becomes a gas. This is because the floor is heated to a temperature of about 175° F. by an electric heater 27 fastened to its lower surface and controlled by a thermoswitch 28. The side wall of cylinder 1 extends down below the heater and the bottom is closed by a base 29 screwed into it.

To permit the oxygen to flow freely into the pressure vessel, the vessel is vented. For this purpose it may be provided with an outlet port 31 in its side wall, to which a vent tube 32 is connected. The vent tube includes a normally open vent-closing valve 33, which is an inverted check valve. Thus, a ball check valve 34 is turned bottom side up so that the ball will fall away from its seat 36 and be supported by a screen 37 near the bottom of the valve. Gas at a relatively low flow rate can flow up through the valve around the ball without lifting it and closing the valve. Beyond this valve the vent tube is equipped with a normally closed solenoid valve 38. The two valves just mentioned can be by-passed by a blow-off tube 39 connected to the vent tube between the pressure vessel and the vent-closing valve 33. The blow-off tube normally is closed by a solenoid valve 40.

While the cup 18 is being filled with liquid oxygen, the vent solenoid valve 38 is held open. Gas in the pressure vessel therefore can flow out through the open vent valves. At that time the rate of flow through the vent tube is not great enough to lift the ball 34 and close the vent-closing valve, because a vent rate of 105 to 110 liters per minute is required to force the ball up against its seat. Oxygen in tank 9 under a pressure of 3 to 13 pounds per square inch gauge results in a vent rate at the valve of only 30 to 80 l.p.m. However, when the cup dumps liquid oxygen onto the heated floor of the pressure vessel, the liquid is quickly vaporized and the gas pressure in the vessel increases greatly. This increases the rate of flow through the vent tube, and the vent-closing valve 33 will be closed. It will be seen that closing of this valve is controlled by the gas pressure itself, and not by a timer. However, a short time after the valve is closed, solenoid valve 38 also is closed as will be explained later.

When the outlet of the pressure vessel is closed, the gas in the vessel is warmed for a period of about five minutes to obtain a homogeneous mixture of acetylene dispersed throughout the oxygen. The pressure rises to 1000–1100 p.s.i.g., depending on the volume of liquid dumped. After the five minute warming period, the gas in the pressure vessel is allowed to flow through a gas analyzer 42, such as a conventional infrared analyzer. For this purpose the gas flows out of the vessel through any suitable outlet opening such as the outlet port 31, and through a conduit 43 and a pressure regulator 44 that provides a constant gas pressure of about 500 p.s.i.g. at the analyzer with a pressure vessel pressure varying from about 1000 to 600 p.s.i.g. Another conduit 46 connects the outlet of the pressure regulator with the inlet of the infrared analyzer. A needle valve 47 in the conduit 48 leading from the analyzer to a flow meter 49 determines the rate of flow through the analyzer, which preferably is about 5 l.p.m.

A solenoid valve 51, open only during analyzing, would normally keep gas from passing from the pressure vessel to the analyzer. The valve preferably is located in conduit 46 between the regulator and the analyzer. To maintain gas pressure in the analyzer when valve 51 is closed, a second normally closed solenoid valve 52 is connected with the outlet of the analyzer to prevent flow therefrom to the flow meter and atmosphere. Since valve 51 might not seal against flow from the analyzer back toward the pressure vessel when the pressure therein is lower than at the analyzer, a third normally closed solenoid valve 53 is used beside valve 51, this third valve sealing against flow from the analyzer. Also, beyond the outlet of needle valve 47 there is a normally closed solenoid valve 54 to prevent a pressure drop, due to the conduit volume between valve 53 and the needle valve, when valve 53 is opened. Of course, all of these solenoid valves are open while the oxygen is being analyzed.

Analyzing of a gas sample continues for about ten minutes, which is the time required for the gas pressure in the pressure vessel to decrease from about 1000 p.s.i.g. to 650 p.s.i.g. When the pressure reaches this lower value, the solenoid valves 51, 52, 53 and 54 are closed and the sample remaining in the analyzer is trapped therein at 500 p.s.i.g. The purpose of trapping the sample in the analyzer is to prevent an unbalanced condition therein due to pressure drop. At the same moment that the solenoid valves in the analyzing line are closed, the blow-off valve 40 is opened to blow down the pressure vessel. Before this occurred, the vent-closing valve 33 reopened because it is made with a slight leakage past its seat so that the gas pressure on opposite sides of it can equalize while the vent solenoid valve 38 remains closed, and thereby allow the ball to fall away from its seat. The blow-off valve opens about twenty seconds before vent solenoid valve 38, to blow down the pressure vessel sufficiently to prevent reclosing of the vent-closing valve when the vent solenoid valve opens. Then the blow-off valve closes, but the vessel remains vented to the atmosphere through valves 33 and 38 while the cup is being refilled with liquid oxygen.

The solenoid valves are under the control of an electric switch that is controlled by the gas pressure in the presure vessel. As shown in FIG. 3, the arm 56 of the pressure switch 57 is linked to a bellows 58 which, in turn, is connected through a tube 59 with the pressure vessel, such as through the blow-off tube 39 as shown in FIG. 1 or through any other suitable connection. When the pressure in cylinder 1 is below about 650 pounds p.s.i.g., the switch arm is held against the upper contact 61 as shown, but when the pressure exceeds 650 pounds the bellows expands and swings the arm against the lower contact 62 of the switch. The switch arm is permanently connected to hot wire 63 of an electric circuit that is open at the time depicted by FIG. 3. The other wire 64 of the circuit is grounded. Wire 63 is connected in series with the thermoswitch 28 and heater 27 of the pressure vessel.

The upper contact of the pressure switch is connected by a wire 66 to the upper one of the contacts 67 of a normally closed thermal relay A, the lower contact of which is connected by a wire 68 to the heating coil 69 of the relay and to ground. The coil requires about five minutes to heat the relay sufficiently for its contacts to separate. This is a safety relay, and when the system is working properly it never opens. The lower contact of the relay is also connected by a wire 70 to the heating coil 71 of a second normally closed thermal relay B that opens after only a few seconds, such as about five, when its coil is in circuit. The same wire is connected with the upper one of the contacts 72 of the relay, and also to heating coil 73 of a third normally open thermal relay C that closes preferably after only twenty seconds when the coil is placed in circuit. The upper contact 74 of this relay is connected with the main wire 63, and the lower contact 75 is connected with the vent solenoid valve 38.

The upper contact of the middle relay B is connected by a wire 76 with the switch arm 77 of a timer switch D, and by a wire 78 with three switch arms 79, 80 and 81 of a power relay 82. The lower contact of relay B is connected by a wire 83 with the motor 84 of the timer switch and also with the upper contact of the power relay. When the timer motor is energized through pressure switch arm 56 and contact 61, it rotates a notched disc 86 one revolution in thirty seconds and stops because, during rotation, a dog 87, normally projecting into the disc notch, is forced out of the notch and rides on the periphery of the disc. The dog is linked to switch arm 77, which it swings into engagement with a contact 88 connected by a wire 89 with a solenoid coil 90. When the coil is energized, its core 91 will raise the three arms of the power relay as a unit. The upper arm will engage the upper contact 85 and thereby complete a circuit through the coil to the timer motor to guarantee that the motor will run until the disc has made a complete revolution and dog 87 has dropped back into the disc notch to open the circuit to the motor. Therefore, relay B does not have to be relied upon for proper operation of the timer except to start it.

The raised lower arm 81 of the power relay will engage a contact 92 connected with blow-off valve 40 to hold it open thirty seconds. After the first twenty seconds contacts 74 and 75 of relay C will close and thereby open valve 38 and maintain it open until coil 73 is cut out of the circuit by the breaking of the circuit at contact 61 of the pressure switch.

There also is a second timer switch E containing two notched discs 93 and 94 rotated by a motor 95. It requires nearly five minutes for these discs to make one revolution. The motor is connected by a wire 96 with the middle contact 97 of power relay 82, so when the relay is closed the second timer switch starts to operate and continues to do so for the thirty seconds that the power relay is closed. This causes discs 93 and 94 to force dogs 98 and 99 out of their notches. Dog 98 is linked to a switch arm 100, which it will swing against a contact 101 connected by a wire 102 with motor 95. The arm is connected with a wire 103 leading to the lower contact 62 of the pressure switch 57. Wire 103 also is connected with a switch arm 104 that is linked to dog 99 and pushed by it away from a contact 105 connected by a wire 106 with the four solenoid valves 51–54 of the analyzing line.

Assuming in FIG. 3 that an analyzing period has just been completed because the pressure in the pressure vessel has decreased to the point where pressure switch arm 56 has been lifted away from contact 62 to permit solenoid valves 51, 52, 53 and 54 to close, the moment the arm engages contact 61 the timer D will start to operate. That will close power relay 82 for thirty seconds, during which time the timer E will operate so that dogs 98 and 99 will be forced out of the notched discs and blow-off valve 40 will be opened to blow down cylinder 1 to approximately atmospheric pressure. Before the valve closes again, solenoid vent valve 38 will be opened by the closing of relay C, but by that time the flow rate from the cylinder will be low enough that it will not affect vent-closing valve 33.

While the vent is open, liquid oxygen falls into cup 18 until it is full enough to dump the liquid on the hot surface beneath it, whereupon the oxygen will be vaporized and the flow rate through the vent increased sufficiently to close the vent-closing valve. The system is now sealed and the gas pressure builds up rapidly to 1000 p.s.i.g. or more and quickly shifts pressure switch arm 56 to lower contact 62. That starts timer E because dog 98 is holding arm 100 against contact 101. However, solenoid valves 51–54 will remain closed for nearly five minutes while disc 94 rotates, because arm 104 is held away from contact 105 by dog 99. As soon as the two dogs drop back into the notches in the two discs, the timer motor circuit is broken and the four solenoid valves in the analyzer line are opened so that analyzing of the gaseous oxygen sample can begin. After about ten minutes, when the gas pressure has decreased to below 650 p.s.i.g., pressure switch 57 reverses and the pressure vessel is blown down and the cycle is repeated.

Vent-closing valve 33 is open during the blow down, because, when valve 38 closed after the switch arm 56 was pushed away from contact 61 at the beginning of the analyzing cycle, leakage past ball 34 permitted the pressure above and below the ball to equalize enough for the ball to fall away from its seat. As a precaution against the possibility of a delayed discharge of high pressure gas from the pressure regulator 44 back through conduit 43 causing a false closing of the vent-closing valve while the cup is being filled, a check valve 108 may be connected in conduit 43 ahead of the pressure regulator.

Another safety feature is incorporated in the electrical system to indicate a failure of the cup to dump, should that happen to occur. Thus, the lower contact of thermal relay A is connected by a wire 110 with a solenoid coil 111 of a relay 112. The core 113 of the relay is linked to a pivoted switch arm 114 that normally is in a lower position resting on a contact 115 connected with an electric light 116. The arm is connected by a wire 117 with the upper contact of relay A. When the power is turned on the circuit, the coil is energized and arm 114 is raised so that the light will not be illuminated. When pressure switch 57 shifts in order to initiate the analyzing cycle, the circuit to the coil will be broken, but of course it also will be broken to the light. However, if the pressure switch has not shifted by about five minutes after the cup filling has started, due to some malfunction resulting in the cup not dumping liquid oxygen, the heat of relay coil 69 will cause contacts 67 to open and break the circuit to coil 111. Switch arm 114 will then drop outer contact 115 and complete a circuit to the failure light. This will warn the operator that something is wrong. After a short time coil 69 will cool sufficiently to allow contacts 67 to close again and the light will go out, but if the fill cycle has not corrected itself the light will go on again.

The apparatus disclosed herein is entirely automatic, but it does not depend upon a timer to start the fill and analyzing cycles. Rather, the apparatus is under the control of the oxygen itself. When the liquid oxygen fills the cup and is dumped out, the increase is pressure in the pressure vessel causes the vent to be closed and the analyzing cycle to begin. Reduction of pressure in the system after a period of analyzing results in the analyzing line being shut off and the fill cycle being repeated. Therefore, barring accidents, as long as liquid oxygen can flow into the pressure vessel, samples of it will be analyzed periodically. The high gas pressure in the system also serves the important function of making acetylene and the like determinations more precise because there will be more impurities per liter of gas under 500 p.s.i.g. than under atmospheric pressure and they can, therefore, be detected more accurately.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for periodically analyzing samples of oxygen gas derived from a source of liquid oxygen, comprising a pressure vessel, a conduit for delivering liquid oxygen to said vessel, a check valve in the conduit preventing flow away from the vessel, means for heating an inner surface of the vessel, a receptacle in the vessel for alternately receiving a predetermined quantity of liquid oxygen from said conduit and discharging it onto said heated surface to convert the liquid into high pressure gas, a vent connected with said vessel for venting it while liquid oxygen is filling said receptacle, means for closing said vent when said receptacle discharges its contents, a gas analyzer having an inlet and an outlet, a gas pressure regulator, conduits connecting the regulator with the analyzer inlet and the inside of said vessel, a normally closed valve between the vessel and analyzer, and means for opening said normally closed valve after said vent has been closed.

2. Apparatus according to claim 1, including a normally closed valve connected with the outlet of the analyzer, said last mentioned means serving to open both of said normally closed valves.

3. Apparatus according to claim 1, in which said vent closing means is actuated by said high pressure gas.

4. Apparatus according to claim 1, in which said receptacle is a cup pivotally supported on a horizontal axis that is above its center of gravity when empty but below its center of gravity when filled with liquid oxygen, whereby the filled cup will pivot and dump its contents.

5. Apparatus according to claim 1, in which said vent closing means includes a normally open inverted check valve adapted to be closed by the increased gas flow therethrough when said receptacle discharges its contents.

6. Apparatus according to claim 1, in which said vent closing means includes a normally open inverted check valve adapted to be closed by the increased gas flow therethrough when said receptacle discharges its contents, a vent valve connected with the outlet of the inverted check valve, and means for closing the vent valve after the check valve has closed, the inverted check valve being provided with a slow leak to permit it to open while said vent valve is closed.

7. Apparatus according to claim 1, in which said vent closing means includes a normally open inverted check valve adapted to be closed by the increased gas flow therethrough when said receptacle discharges its contents, a vent valve connected with the outlet of the inverted check valve, means for closing the vent valve after the check valve has closed, the inverted check valve being provided with a slow leak to permit it to open while said vent valve is closed, a normally closed blow-off valve by-passing said inverted check valve and vent valve, and means for opening the blow-off valve when the gas pressure in said vessel falls to a predetermined point.

8. Apparatus according to claim 1, including an electric switch responsive to the gas pressure in said vessel for initiating the opening of said normally closed valve.

9. Apparatus according to claim 1, including a check valve in the conduit between the pressure vessel and regulator permitting flow only toward the regulator.

10. Apparatus according to claim 1, including means for delaying the operation of said valve opening means for several minutes after said vent has been closed.

11. Apparatus for periodically analyzing samples of oxygen derived from a source of liquid oxygen, comprising a pressure vessel, a conduit for delivering liquid oxygen to said vessel, a check valve in the conduit preventing flow away from the vessel, means for heating an inner surface of the vessel, a receptacle in the vessel for alternately receiving a predetermined quantity of liquid oxygen from said conduit and discharging it onto said heated surface to convert the liquid into high pressure gas, a vent connected with said vessel for venting it while liquid oxygen is filling said receptacle, means for closing said vent when said receptacle discharges its contents, a gas analyzer having an inlet and an outlet, a gas pressure regulator, conduits connecting the regulator with the analyzer inlet and the inside of said vessel, a normally closed valve between the vessel and analyzer, means for opening said normally closed valve after said vent has been closed and maintaining it open until the gas pressure in said vessel has fallen to a predetermined point, and means for then opening said vent to permit said receptacle to be refilled.

12. Apparatus for periodically analyzing samples of oxygen derived from a source of liquid oxygen, comprising a pressure vessel, a conduit for delivering liquid oxygen to said vessel, a check valve in the conduit preventing flow away from the vessel, means for heating an inner surface of the vessel, a receptacle in the vessel for alternately receiving a predetermined quantity of liquid oxygen from said conduit and discharging it onto said heated surface to convert the liquid into high pressure gas, a vent connected with said vessel for venting it while liquid oxygen is filling said receptacle, means for closing said vent when said receptacle discharges its contents, a gas analyzer having an inlet and an outlet, a gas pressure regulator, conduits connecting the regulator with the analyzer inlet and the inside of said vessel, a normally closed valve between the vessel and analyzer, a throttling valve connected with the outlet of the analyzer, a normally closed valve on each side of said throttling valve, and means for opening all of said normally closed valves after said vent has been closed.

13. Apparatus for periodically analyzing samples of oxygen gas taken from a source of liquid oxygen, comprising a pressure vessel, a conduit for delivering liquid oxygen to said vessel, a check valve in the conduit preventing flow away from the vessel, means for heating an inner surface of the vessel, a receptacle in the vessel for alternately receiving a predetermined quantity of liquid oxygen from said conduit and discharging it onto said heated surface to convert the liquid into high pressure gas, a vent connected with said vessel for venting it while liquid oxygen is filling said receptacle, means for closing said vent when said receptacle discharges its contents, a gas analyzer having an inlet and an outlet, a gas pressure regulator connected with the analyzer inlet and the inside of said vessel, a normally closed valve preventing gas flow through the analyzer, and electrically operated means responsive to the gas pressure in said vessel for opening said normally closed valve after said vent has been closed.

14. Apparatus according to claim 13, in which said electrically operated means includes an electric switch controlled by the gas pressure in said vessel, and a timer operatively connected with said normally closed valve and controlled by said switch.

References Cited in the file of this patent

UNITED STATES PATENTS

| | | |
|---|---|---|
| 630,770 | Blackford | Aug. 8, 1899 |
| 2,661,271 | Hyatt et al. | Dec. 1, 1953 |
| 2,795,132 | Boehme et al. | June 11, 1957 |
| 2,884,943 | Dobrick | May 5, 1959 |